(12) United States Patent
Duta

(10) Patent No.: US 11,111,165 B2
(45) Date of Patent: Sep. 7, 2021

(54) PROCESS AND APPARATUS FOR TREATING WATER

(71) Applicant: Infinite Water Technologies Pty Ltd, Byron Bay (AU)

(72) Inventor: Gheorghe Emil Duta, Victoria (AU)

(73) Assignee: INFINITE WATER TECHNOLOGIES PTY LTD, Byron Bay (AU)

( * ) Notice: Subject to any disclaimer, the term of this patent is extended or adjusted under 35 U.S.C. 154(b) by 109 days.

(21) Appl. No.: 15/558,402

(22) PCT Filed: Mar. 16, 2016

(86) PCT No.: PCT/AU2016/050184
§ 371 (c)(1),
(2) Date: Sep. 14, 2017

(87) PCT Pub. No.: WO2016/145487
PCT Pub. Date: Sep. 22, 2016

(65) Prior Publication Data
US 2018/0050938 A1 Feb. 22, 2018

(30) Foreign Application Priority Data

Mar. 16, 2015 (AU) .............................. 2015900927

(51) Int. Cl.
*C02F 1/72* (2006.01)
*C02F 9/00* (2006.01)
(Continued)

(52) U.S. Cl.
CPC .............. *C02F 1/725* (2013.01); *C02F 1/441* (2013.01); *C02F 1/5245* (2013.01); *C02F 1/686* (2013.01);
(Continued)

(58) Field of Classification Search
None
See application file for complete search history.

(56) References Cited

U.S. PATENT DOCUMENTS 6,491,797 B1   12/2002   Locke et al.
2007/0003370 A1*   1/2007   Liao ..................... B01D 61/025
                                                  405/129.9
(Continued)

FOREIGN PATENT DOCUMENTS

AU   2003-200855 A1   9/2003
CN   201809251 U   *   4/2011
(Continued)

OTHER PUBLICATIONS

Machine translation of CN #201809251U, pp. 1-8. (Year: 2011).*
Nitto Hydranautics, "Chemical Pretreatment for RO and NF", 2013, pp. 1-16, accessed online at http://membranes.com/docs/tab/TAB111.pdf). (Year: 2013).*
Machine translation of CN103708600A, pp. 1-5. (Year: 2014).*
Ray et al. (International Journal of Environmental Studies, 2007, Title and Abstract. (Year: 2007).*

*Primary Examiner* — Clare M Perrin
(74) *Attorney, Agent, or Firm* — BakerHostetler

(57) ABSTRACT

A process for treating water containing contaminants comprising the steps of: (a) contacting water to be treated with an inorganic oxidising salt containing manganese or iron for a time effective for oxidising a portion of said contaminants; (b) contacting water treated in oxidation step (a) with at least a chlorine containing agent for disinfection and to generate, in situ and through reaction with chemical compounds produced in pre-oxidation step (a), a coagulant for coagulating oxidised contaminants present in the water; (c) separating coagulated contaminants from the water; and (d) subjecting water to a catalytic oxidation for oxidising residual oxidisable contaminants, said catalytic oxidation being catalysed, in part, by manganese or iron species, depending on the residual selected oxidising salt left in solution in water after oxidation step (a). Permanganates are particularly advantageous inorganic oxidising salts and chlorine dioxide is a particularly preferred chlorine contain- (Continued)

ing disinfecting agent for use in step (b). Apparatus for conducting the process is also disclosed.

25 Claims, 5 Drawing Sheets

(51) Int. Cl.
*C02F 1/52* (2006.01)
*C02F 1/44* (2006.01)
*C02F 1/68* (2006.01)
*C02F 1/76* (2006.01)
*C02F 1/56* (2006.01)
*C02F 101/10* (2006.01)

(52) U.S. Cl.
CPC ............... *C02F 1/727* (2013.01); *C02F 1/76* (2013.01); *C02F 9/00* (2013.01); *C02F 9/005* (2013.01); *C02F 1/44* (2013.01); *C02F 1/5236* (2013.01); *C02F 1/56* (2013.01); *C02F 1/72* (2013.01); *C02F 2101/101* (2013.01); *C02F 2209/03* (2013.01); *C02F 2209/06* (2013.01); *C02F 2209/08* (2013.01); *C02F 2303/04* (2013.01); *C02F 2305/02* (2013.01)

(56) References Cited

U.S. PATENT DOCUMENTS

| | | | |
|---|---|---|---|
| 2011/0094965 A1* | 4/2011 | Al-Samadi | B01D 61/022 |
| | | | 210/652 |
| 2012/0039792 A1* | 2/2012 | Duta | C02F 9/00 |
| | | | 423/580.1 |

FOREIGN PATENT DOCUMENTS

| | | | |
|---|---|---|---|
| CN | 201809251 U | | 4/2011 |
| CN | 103708600 A | * | 4/2014 |
| CN | 103708600 A | | 4/2014 |
| EP | 2327307 A1 | | 6/2011 |
| JP | 2001-113291 A | | 4/2001 |
| JP | 2010-158615 A | | 7/2010 |
| WO | WO 2004/060834 A1 | | 7/2004 |
| WO | WO 2006/069418 A1 | | 7/2006 |
| WO | WO 2010/115233 A1 | | 10/2010 |
| WO | WO 2014/066931 A1 | | 5/2014 |

\* cited by examiner

PROCESS AND APPARATUS FOR TREATING WATER

CROSS-REFERENCE TO RELATED APPLICATIONS

This application is a National Stage of International Patent Application No. PCT/AU2016/050184 filed Mar. 16, 2016, which claims from the benefit of Australian Patent Application No. 2015900927 filed Mar. 16, 2015, the disclosures of each of which are incorporated herein by reference in their entirety.

This invention relates to process and apparatus for treating water such as treating water with high oxygen demand and contaminants difficult to oxidise to compliant level as required by the desired water quality standards and contaminants of emerging concern such as defined by United States Environmental Protection Agency.

Water to be treated may be water from lakes, ponds, dams and rivers to be treated to drinking water standard. Other examples are municipal waste water, industrial waste water from food processing, mining and other industries.

Water scarcity is a growing world problem. During the $20^{th}$ century the world population increased four times while water consumption increased nine times. Availability of raw water sources for treatment and use is decreasing while the water contamination level, complexity and cost of treatment is increasing. Climate variations with hot and dry summer periods lead to algal blooms and often to blue green algae blooms. Increased organic content of the water provides opportunity for pathogen growth and makes disinfection of water more difficult. Many raw water sources, in the past, needed just chlorination to be suitable for human consumption. Chlorination is still the most common disinfection method for drinking water but it becomes a less and less acceptable solution due to deterioration of raw water quality. When raw water has significant organic content, for example above 4 mg/L total organic carbon (TOC), disinfection through chlorination may generate a high level of disinfection by-products and unpleasant taste and odour. The disinfection by-products categories of trihalomethanes and haloacetic acids are known or potential carcinogens and cause many illnesses. There is no known threshold concentration under which the disinfection by-products are completely safe. In order to reduce the undesirable consequences of chlorination, pre-oxidation with ozone has been proposed for addition to conventional water treatment filtration plants. Although water quality is generally improved, treatment with ozone still generates some disinfection by-products which means that ozonation methods need to be treated with some caution. If water contains aldehydes, especially formaldehyde, ozonation may even increase contaminant levels. Ozone is also energy intensive and costly to produce. Ozone is also toxic and residual gas has to be destroyed, preventing it from escaping into the surroundings.

Membrane filtration and separation are becoming a more and more common water treatment solution. Membranes alone solve only part of the problems associated with algal blooms. Membrane based plants have a high risk of expensive failure through bio fouling. Once a biofilm caused, for example, by an algal bloom has formed, it is difficult or impossible to clean and recover the membranes to suitable performance. Often, complete replacement of membranes is the only expensive option. Furthermore, algae retained on dead end filtration membranes, such as microfiltration and ultrafiltration membranes, can decompose increasing the organic content of filtered water. This is caused by high pressure, shear forces and death and decay of algae. When an algal bloom is of blue green algae, the toxicity of blue green algae poses a serious health risk to people consuming the water. Animals coming in contact with the water or drinking the water from affected rivers and lakes may become ill or die. Blue green algae toxins are also spreadable as an aerosol in the wind so causing health problems to people far away from the water body. Blue green algae have properties of both algae and bacteria and another name for them is cyanobacteria. These organisms produce some of the most powerful toxins known, comparable with the notorious dioxins.

Conventional treatment unit processes all have limitations in removal of cyanobacteria and their toxins from water. Chlorination kills a large part of the algae but oxidises only part of their toxins. One serious shortcoming of chlorination is that is not effective in removing an anatoxin-a group of toxins. Anotoxin-a group toxins affect the nervous system, in worse cases causing respiratory paralysis and death. The chlorine dosage required is high and generates a high level of disinfection by products. Granular activated carbon is effective in removing microcystin but not very effective in removing anatoxin-aand cylindrospermopsins. The most effective type of granular activated carbon is wood based. The process has to be tested and effectiveness evaluated.

In practice, water treatment operators are advised to interrupt the use of water from a blue green algae affected area until the algal bloom passes. Using water from other sources might not be an option. In most cases there is no other water source to be used.

Another large category of contaminants of special importance are contaminants of emerging concern which include a broad range of household chemicals and personal care products, herbicides, pesticides and many contaminants of industrial origin persistent in the environment. Conventional wastewater treatment removes or degrades only part of these contaminants. Membrane separation does not degrade these contaminants and does not take them out of the environmental cycle.

It is an object of this invention to treat water contaminated with contaminants which may include one or more of significant oxygen demand, organic substances, algae, algal toxins and contaminants of emerging concern as described above.

With this object in view, the present invention provides, in one embodiment, a process for treating water containing contaminants comprising the steps of:
(a) contacting water to be treated with an inorganic oxidising salt containing manganese or iron for a time effective for oxidising a portion of said contaminants;
(b) contacting water treated in oxidation step (a) with at least a chlorine containing agent for disinfection and to generate, in situ and through reaction with chemical compounds produced in pre-oxidation step (a), a coagulant for coagulating oxidised contaminants present in the water;
(c) separating coagulated contaminants from the water; and
(d) subjecting water to catalytic oxidation for oxidising residual oxidisable contaminants, said catalytic oxidation being catalysed, in part, by manganese or iron species, depending on the residual selected inorganic oxidising salt left in solution in water after oxidation step (a).

In a further embodiment, the present invention provides an apparatus for treating water containing contaminants comprising:

(a) at least one vessel for contacting water to be treated with an inorganic oxidising salt containing manganese or iron with sufficient residence time for oxidising a portion of said contaminants;
(b) disinfecting agent dosing means for supplying a chlorine containing agent for disinfection of water treated in said at least one vessel while generating, in situ and through reaction with chemical compounds produced in said at least one vessel, a coagulant for coagulating oxidised contaminants present in the water;
(c) a separator for separating coagulated contaminants from the water; and
(d) a catalytic oxidation step for oxidising residual oxidisable contaminants, said catalytic oxidation being catalysed, in part, by manganese or iron species, depending on the residual selected inorganic oxidising salt left in solution in water after oxidation step (a).

The inorganic oxidising salt advantageously includes manganese or iron. Much preferred, for its oxidation efficiency—and facility to cost effectively generate manganese hydroxides in situ which act as a coagulant—is a metal permanganate (manganese containing), especially potassium permanganate. Other permanganates may be used including sodium permanganate, barium permanganate, calcium permanganate and aluminium permanganate but not limited to this group. Barium and calcium permanganates may be favoured if sulphate removal is required. Aluminium permanganate may be favoured for enhanced coagulation and co-precipitation of metals. Generally, the Applicant has found that these permanganates oxidise a broad range of organic substances (for example aldehydes, such as formaldehyde, and compounds containing polycyclic carbon rings) to a non-toxic or less toxic form. Reaction products are at least more susceptible to further oxidation in subsequent oxidation steps where advantageously used.

Concentration of permanganate in water for treatment may be targeted in range 0.1 to 10 mg/L with less than 5 mg/L being practical and effective for contaminant removal in accordance with the process. There is no requirement to add chelating agents such as amines or phosphates together with the permanganate.

Ferrate (iron containing) may less preferably be used because it is expensive to prepare and subject to unacceptable instability unless generated on site. Ferrate may, however, be suitable for some applications where ferrate generating apparatus is available.

The in situ coagulant, having generation kinetics advantageously catalysed by presence of the chlorine containing reagent in step (b), precipitates during the coagulation process with a residual amount of dissolved inorganic oxidising salt, and notably iron or manganese, remaining in solution and available as a catalyst for catalytic oxidation if employed as preferred and as described below. In situ coagulants may be one or a combination of manganese, iron and aluminium hydroxides or oxides dependent on selected inorganic oxidising salt and water composition. MnOOH is one possible example having amorphous and polymeric nature making for a desirable in situ coagulant. In the case of potassium permanganate, for example, some manganese also remains in solution to act as such catalyst in catalytic oxidation step (d).

The chlorine containing agent may include, in descending order of preference, chlorine dioxide, a metal hypochlorite (especially sodium hypochlorite or calcium hypochlorite) or much less favourably chlorine gas which is preferably excluded from use to minimise formation of disinfection by-products. Chlorine and hypochlorites are not acceptable for use for disinfection prior to reverse osmosis if the process involves reverse osmosis to remove dissolved salts as a later processing stage. Common reverse osmosis membranes are damaged by free chlorine which must not exceed about 0.05 mg/L in solution for commonly used thin film membranes. Chlorine dioxide is preferred because it favours the kinetics of in situ coagulant generation (for example, and notably, MnOOH) and is an effective disinfectant over a much broader pH range than chlorine, sodium hypochlorite and calcium hypochlorite. This may enable the process to be performed without significant pH adjustment and use of pH adjustment reagents at a cost. Chlorine dioxide use in the process also provides a partial source of oxygen for catalytic oxidation step (d) and leaves a low chlorine residual which will not damage membranes if membrane separation steps, especially reverse osmosis, are used in the process. The chlorine dioxide residual achievable using the current processes is less than 0.2 mg/L, with target range 0.05 to 0.1 mg/L, compared to acceptable range for a distributed water network of 0.2 to 0.8 mg/L.

Chlorine is, however, recognised as a cost effective disinfectant and may be used post-treatment—especially for large water storage and distribution networks—with minimal risk of forming toxic disinfection by-products (DBPs) as the above described treatment process has removed substantially all the precursors to such by-products and which were present in the raw water to be treated. Total organic carbon (TOC) is also controllable to levels substantially below 2 mg/L to prevent formation of DBPs and to provide water with acceptable taste.

The preferred combination of reagents for steps (a) and (b) includes potassium permanganate and chlorine dioxide which the Applicant has found enable steps (a) and (b) to be completed efficiently with good kinetics.

Separation of coagulated contaminants, typically in the form of flocs, from the water may be achieved in a number of ways including through settling and filtration or a combination of both these processes.

Catalytic oxidation step (d), which may be referred to as catalytic advanced oxidation, typically has a polishing effect in removing remaining contaminants through processes such as precipitating remaining iron and manganese, co-precipitation of heavy metals, degradation of dissolved organic material and inactivation and destruction of pathogens such as coliforms. Under catalysed oxidising conditions, highly reactive manganese or iron radicals—such as manganyl or ferryl radicals—are generated together with hydroxyl ions through a Fenton type reaction scheme though not exactly the same since hydrogen peroxide or ozone and acid pH conditions are excluded from use in the described process. Use of permanganate will also tend to favour formation of sufficient manganyl and hydroxyl radicals to achieve co-precipitation of the metals and other contaminant reduction processes which may be sufficient to achieve potable water standards. This result is achieved without recourse to physical oxidation methods such as through use of corona discharge or ultraviolet radiation steps. In addition, the Applicant has not found such radical stability to be an issue in effecting contaminant removal so addition of chelating agents such as polyamines and phosphate salts is not required.

Catalytic oxidation may be conducted in a range of vessels including bed reactors, column reactors or filter beds. Such beds would comprise a granular catalytic material to further catalyse the catalytic oxidation process. Favoured catalytic materials are granules consisting of silica or alumina supported metal oxides or mixtures of metal oxides selected from the group consisting of manganese oxide (green sand and others), manganese dioxide, iron oxides, aluminium oxides, titanium dioxide, perovskite and rare earth oxides. The maximum content of the catalytic component is about 10 wt % of the total weight of a catalytic granule. Catalytic materials may be arranged in layers in possible combination with other materials which assist filtration of oxidation products from water. Examples of such materials include silica sand and filter coal.

Other catalysts that could be used include zeolites and electrically conductive catalytic materials where granular activated carbon is typically used as a support for a metal. Catalytic elements for such case include noble metals (platinum, gold, silver and nickel) and copper.

In such case, a combination of catalysts in solution and solid phase is effectively used in catalytic oxidation step (d). Also, where solid phase catalyst beds are used in catalytic oxidation step (d), the step may include the separator to remove coagulated contaminants generated upstream of the bed. Additional separation steps may be included if required to reduce turbidity of treated water.

Efficient use of permanganate, in terms of cost and contaminant removal, is achievable through the process. This may be demonstrated, for example, by treated water from catalytic oxidation step (d) having no visible colouration due to the presence of residual potassium permanganate even where water introduced to catalytic oxidation step (d) has visible colouration due to presence of potassium permanganate. Similar benefit is expected for like permanganates.

The above described processes may include a membrane separation step (e), such as reverse osmosis, where required for reduction of dissolved salt levels, i.e desalination including sulphate removal. The benefits of using chlorine dioxide are apparent in such case. Oxidation potential may be measured ahead of the membrane separation step and adjusted, for example through degassing to remove part of the dissolved oxygen and chlorine, if required. This should not be necessary where chlorine dioxide is used because of the low residual chlorine level which achieves desired objects of preventing bio-fouling whilst not damaging membranes in a manner encountered with chlorine gas and hypochlorites. The membrane separation step is preferably carried out in a continuous mode.

Water may be treated with oxygen, or at least an oxygen enriched gas such as oxygen enriched air, before oxidation step (a) in cases when this is economical in reducing the dosage of pre oxidant. Oxygen may be generated by a suitable oxygen generator whether adsorption or membrane based.

The Applicant has observed that the above described processes are operable with preferred operating pressures being about atmospheric pressure. Water heating apparatus is not required either because the process proceeds at acceptable rate for water treatment at ambient temperature at the geographic location of the module. The process is therefore advantageously carried out at ambient temperature and ambient or near ambient pressure range. Such pressure range is substantially lower than for conventional water treatment systems and pressure reducing means may be required to reduce water pressure prior to introduction to the process and apparatus.

In some applications, such as for treatment of effluents from dyeing and printing factories, biological oxidation demand (BOD) or chemical oxidation demand (COD) of water to be treated may require a treatment step prior to step (a). Biological treatment may be used for this prior treatment step and is advantageously conducted where, for example, COD is greater than about 1000 mg/L.

The following, non-limiting description, of some preferred embodiments of the water treatment process and apparatus of the invention will be better understood with reference to the following FIGS. 1, 2, 3, 4 and 5 in which:

FIG. 1 is a process diagram of a water treatment apparatus constructed and, operated in accordance with one embodiment of the process of the present invention.

FIG. 2 is a process diagram of a water treatment apparatus constructed and operated in accordance with another embodiment of the present invention for the case of higher amount of suspended solids. Turbidity is greater than 10 NTU and lower than about 50 NTU. Water treatment capacity could be higher than 200 cubic meters per day;

Figure 1:
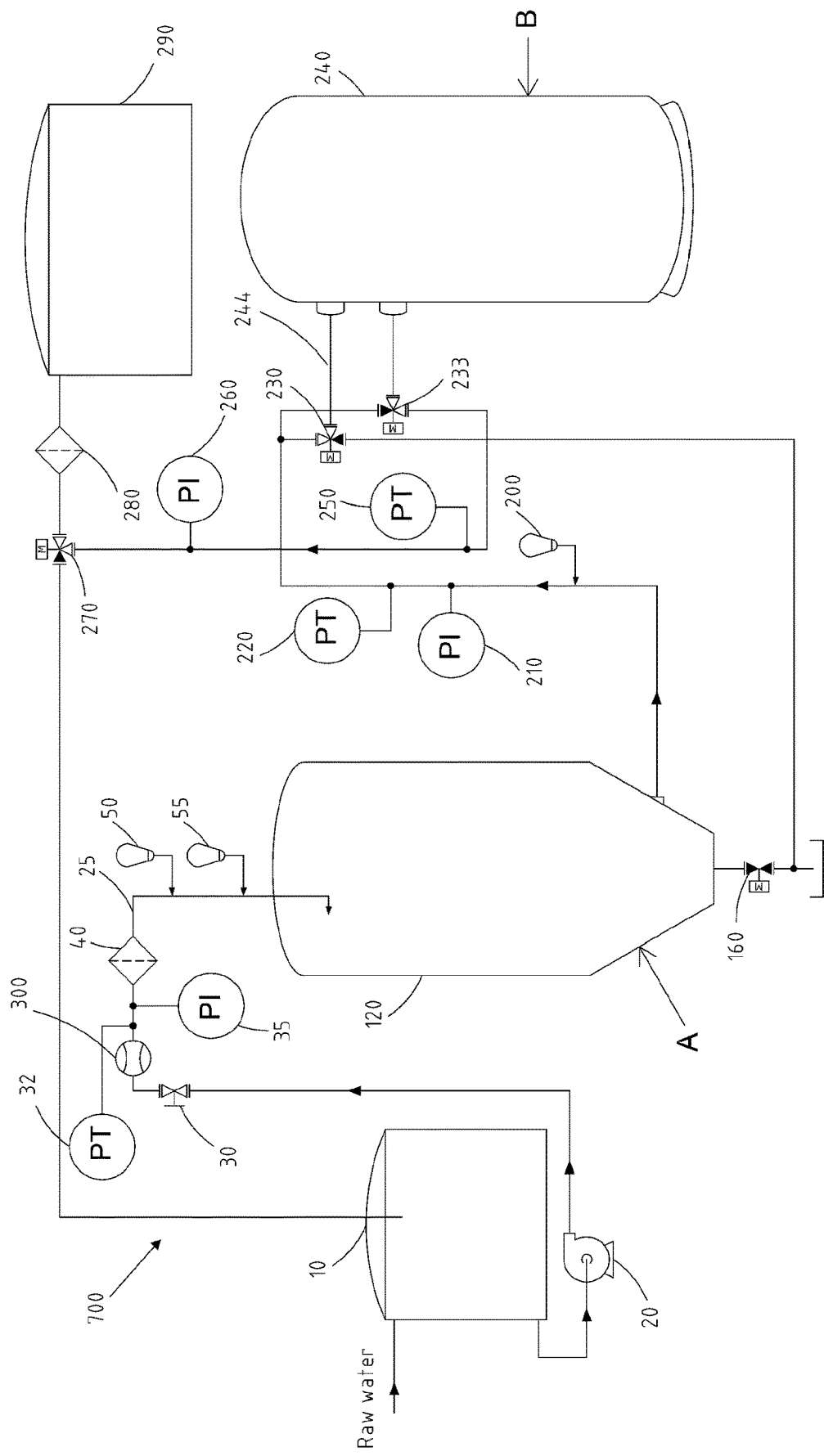
Figure 5:
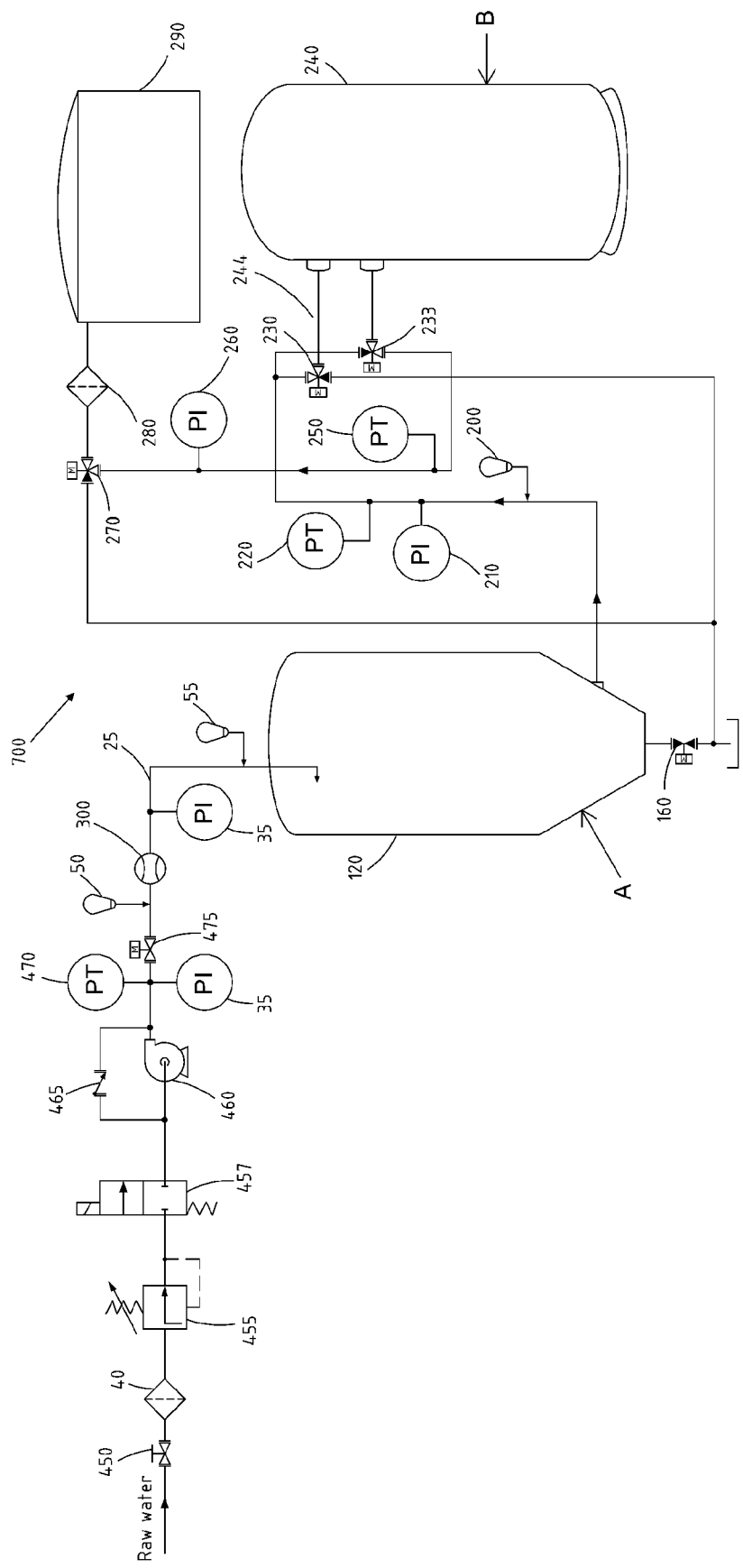

FIG. 5 is a process diagram of water treatment apparatus constructed and operated in accordance with another embodiment of the present invention with treatment capabilities the same as the embodiment shown in FIG. 1 for the case of bulk supply of water to be treated. The supplied water could be treated water with turbidity lower than 10 NTU or municipal piped water treated before distribution to drinking water quality guidelines.

In each of FIGS. 1, 2, 3, 4 and 5, there is shown a water treatment plant 700 which implements a process including the following steps from the above described water treatment process: pre-oxidation; disinfection and coagulation of oxidised contaminants and catalytic oxidation.

Raw water is initially stored in a buffer tank 10 in plant 700 though raw water could equally well be stored in an intermediate pond or taken from a river, lake or underground aquifer as described later in the specification. The water has significant turbidity and contains a range of contaminants which may include pathogens, metals including heavy metals, inorganic species such as nitrite, and a range of toxic organic substances including polycyclic carbon compounds, aldehydes and trihalomethanes.

Pump 20, which delivers water from buffer tank 10 to the pre-oxidation vessel 120 is preferably a multistage centrifugal pump of high efficiency, advantageously in the vicinity of 80%, controlled through a variable frequency drive. The effective water flow to pre-oxidation vessel 120 is monitored by flow transmitter 300 and the plant 700 control system varies the speed of pump 20 so that the programmed flow rate is maintained and changed according to functional requirements of plant 700. The pressure capacity of the plant is relatively low to reduce pumping costs. When the treated water exiting the catalytic module does not have to be pumped a long distance away or high level above plant outlet, 200 kPa pressure capacity of the pump is sufficient.

Sediment is filtered from the water by sediment filter 40 noting that coarse filtration or screening may be required prior to buffer tank 10 dependent on particle size of material present in the available water resource. The nominal filtration resolution of the sediment filter 40 should be not less than 40 microns depending on water quality and operating conditions of the plant 700. The recommended upper limit of nominal filtration resolution of the sediment filter is 500 microns. Pressure transmitters 32 and 220 generate pressure signals for plant control system and operator to determine whether sediment filter 40 operation is normal, cleaning is required or, in some cases, water treatment plant 700 operation should be stopped altogether for maintenance.

If the pH of the raw water needs correction prior to pre-oxidation, pH adjustment to pH 6.5 to 8.5 is done through adding a suitable agent to the water through the chemical dosing unit 50. If pH has to be increased, the preferred chemical to be used is sodium hydroxide. The preferred pH range represents a compromise between pH specification for drinking water and pH range favouring metal co-precipitation, especially manganese co-precipitation.

Dosage of acid to decrease the pH, if needed, is preferably done upstream from the dosage of dosing unit 55 for introducing inorganic oxidising salt containing manganese or iron to the water to implement the pre-oxidation step. Potassium permanganate is used in this case with target concentration in water to be treated of less than 5 mg/L. This is to take into account that degradation of organic material through oxidation is more efficient at lower pH because $OH^-$ ion activity and interference with oxidation of organic matter is lower at acidic pH. It follows that the dosage of sodium hydroxide to increase pH, if needed, should be done downstream of dosing unit 55.

Pre-oxidation vessel 120 enables contacting of potassium permanganate (the preferred inorganic oxidising salt for pre-oxidation) with the water to enable pre-oxidation of a portion of water contaminants. Vessel 120 provides effective residence time for contaminant oxidation reactions to progress such that contaminant concentrations fall towards required drinking water standards. Five minutes is sufficient in this case. When the raw water contains significant amount of iron and manganese, ferric hydroxide and manganese III oxide (MnOOH) precipitation and polymerisation also starts in vessel 120. It is important that the water travels downwards at uniform speed across the cross section of vessel 120 and a water spreader may be used to assist this process.

Vessel 120 may be of special purpose design or a top mounting commercial filter container typically used for mixed medial filtration and sand filtration. If, as here, the expected amount of sediment and precipitate is large, the bottom of vessel 120 is made conical and the outlet 121 is connected at a raised level from the base to allow sediment retention for a period of time before discharge is required. The electrically operated valve 160 at the bottom of vessel 120 opens intermittently to discharge such sediment. Alternatively, the valve 160 may be of manually operated type and operated by the plant operator.

Water with pre-oxidised contaminants exiting vessel 120 flows to catalytic oxidation reactor 240 which comprises a fixed bed of granular catalytic material being granules of silica supported manganese dioxide. The catalytic granular material may be arranged in multiple layers, in combination with other materials such as silica sand (glass grade preferred and filter coal, in order to perform filtration, catalytic oxidation and catalytic advanced oxidation processes. The silica sand, of coarser size than the catalytic granules, is preferably selected to have in its natural composition iron oxides. In addition oxides of manganese, titanium and aluminium are of benefit if naturally present in the silica sand. The presence of metal oxides in the silica sand and the granular catalytic material generally promotes catalytic oxidation. The coarse silica may forms the bottom layer of the fixed bed of catalytic oxidation reactor 240. The silica supported manganese granular catalytic material is then arranged in two or more layers above the silica sand. The top layer of the fixed bed of the reactor is preferably filter coal. The filter coal is coarser than the granular supported manganese dioxide catalytic material and allows retention of large amount of coagulated suspended solids. The filter coal layer prevents metal oxide and hydroxide flocs from forming a compact gelatinous layer above the catalytic material in short time and prevent water from flowing through.

The catalytic oxidation processes differ from the direct oxidation conducted in step (a) through contaminant oxidation by permanganate. Catalytic oxidation generally happens at the surface of the granules of catalytic material and at the active sites of the catalyst component, here manganese dioxide. Catalytic advanced oxidation includes two stages, the first involving oxidation at the surface of the catalyst; and the second involving oxidation away from the surface of the catalyst, it is postulated through Fenton like reactions with iron cycling through valence 2 and 3 and manganese through valence 2 and 4. At the surface of the catalyst, iron and manganese are oxidised. Then, those iron and manganese oxides, moving away from surface of catalyst, are reduced. The oxidising radicals formed in this process include hydroxyl, manganyl and ferryl radicals, these radicals having sufficient stability to effectively conduct contaminant removal without addition of chelating agents in the form of polyamines or phosphates.

These catalytic oxidation processes involving oxidation and precipitation of iron and manganese encourage co-precipitation of elements with similar electro-negativity and including copper, lead, chromium, cobalt, nickel, zinc and arsenic (a particularly significant contaminant in water resources in developing countries).

Upstream of this reactor 240, dosing unit 200 introduces a chlorine containing disinfection agent to the water. Dosing unit 200 preferably doses chlorine dioxide in preference to other chlorine containing agents to achieve the benefits described above. Maximum chlorine dioxide dosage in this case and those described below did not exceed 1-1.5 mg/L to ensure chlorite residual in treated water is below any set chlorite limit, e.g 0.8 mg/L in Australia. Oxygen requirements for oxidation need to be made up, if required, from oxygenation or higher dosing of the potassium permanganate or other selected inorganic oxidising salt.

After dosage of chlorine dioxide through dosing unit 200, part but not all of the manganese (supplied through the potassium permanganate addition) will precipitate from the water and form an in situ coagulant for the pre-oxidised contaminants in a process with generation kinetics considerably improved by the presence of chlorine dioxide. This process occurs in the line to the catalytic oxidation reactor 240 and in a headspace provided above the catalyst bed.

Coagulation and flocculation under action of the in situ coagulant takes place aggregating suspended solids which will be retained in the upper side of the bed of catalytic reactor 240 which acts as a filter.

Pressure indicator 210 provides visual indication of pressure before catalytic oxidation reactor 240, the same as the pressure monitored by pressure transmitter 220. In the normal mode of operation of catalytic reactor 240, water passes through valve 230 and is directed to the upper side of reactor 240. Then water travels downwards through the headspace above the fixed bed and then through the bed for catalytic oxidation as above described, with treated water being collected by lateral pipes at the bottom of the reactor.

The lateral pipes join into a central pipe raising though the middle of the bed and connected to the outlet 241 of the reactor 240. Pipe arrangements for the catalytic reactors described herein are the same as used according to known practice for pressurised sand filters and mixed media filters commonly used in water treatment processes (though at lower pressure in this case). Water exiting catalytic reactor 240 passes through valve 233 and on to valve 270. Pressure transmitter 250 monitors the pressure at the exit of the reactor. Pressure indicator 260 provides visual indication of the same pressure.

Water passing through valve 270 is directed to filter 280 and then on to treated water storage tank 290. The filter 280 has typical nominal filtration resolution of 1 micron. Filter 280 may be omitted if water production is for other purposes for drinking water. The role of filter 280 is to retain small particles which may escape from time to time from the bed of catalytic reactor 240.

When the pressure difference between pressure measured by pressure transmitter 220 and pressure transmitter 250 reaches a set value, the control system initiates backwashing of the catalytic oxidation reactor for removal of the contaminant solids. For backwash mode, valves 230 and 233 change position. Water passes first through valve 233 and is directed though the central pipe inside the reactor and to the bottom of the reactor. The water exits through the lateral pipes and travels upwards expanding the catalytic bed and entraining solids and precipitates accumulated in the bed. The water exits reactor 240 through outlet 244, through valve 230 and is directed to waste as spent backwash water. The spent backwash water may be further treated for sludge thickening and filtration and the water recovered and sent to the buffer tank 10 to be mixed with raw water. The backwash mode lasts 10 to 20 minutes.

When the backwash is completed, valves 230 and 233 move back into normal mode of operation. However, following backwashing and re-settling of the bed, the bed contains water which has not been subjected to the required catalytic oxidation. This water is directed to the front end of water treatment plant 700, specifically to raw water buffer tank 10. The operating mode following backwash is called rinse mode. In the case of rinse mode, the water passing through valve 270 is directed to buffer tank 10 instead of treated water storage tank 290. The duration of rinse mode is from 30 seconds to a few minutes. After completion of rinsing, valve 270 changes position and the plant is back in normal operating mode.

EXAMPLE 1

Treatment of Groundwater

Raw groundwater was not acceptable for drinking due to excessive manganese content. Excessive manganese causes black staining of laundry and water fixtures and is neurotoxic to children. Another notable contaminant was formaldehyde. Pathogens were not of concern. This water was treated in accordance with the process flow diagram of FIG. 1 as described above. Results were as follows:

| Contaminant  | Units | Raw Water | Treated Water | ADWG |
|---|---|---|---|---|
| Manganese    | mg/L  | 0.209     | 0.0015        | 0.1  |
| Formaldehyde | mg/L  | 0.15      | <0.10         | 0.5  |
| Iron         | mg/L  | 0.05      | <0.05         | 0.3  |
| Turbidity    | NTU   | 0.12      | <0.1          | 1    |
| Colour       | HU    | 3         | 2             | 15   |

ADWG: Australian Drinking Water Guidelines

Manganese was removed to compliant limit. Water appearance and taste was good with no bad smell. There was an overall improvement in water quality.

Figure 2:
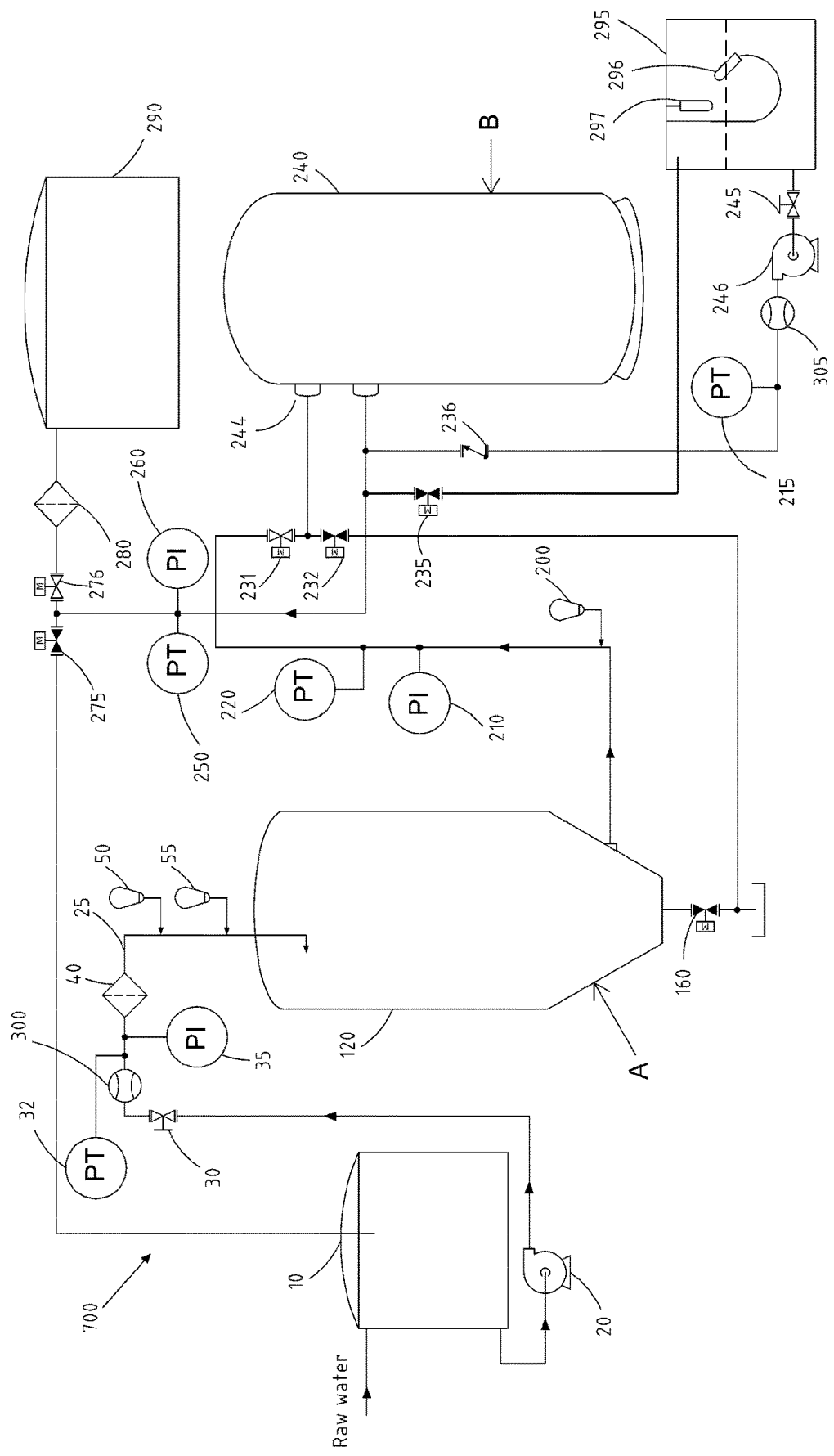

With reference to FIG. 2, the process flow diagram and mode of operation is very similar to that described for FIG. 1 but addresses the case that the amount of suspended solids and turbidity is higher than for water treated in the water treatment plant 700 of FIG. 1. Here, the larger amount of suspended solids makes it less efficient and time consuming for the catalyst/filter bed to be backwashed with in line water. Suspended solids in the water used for backwashing will be found throughout the bed when the backwash sequence is finished. As shown in FIG. 2, the backwash mode uses clean water stored in tank 295.

In normal mode, valve 231 is open and valve 232 is closed. Water passing through valve 231 is directed to the upper side of the catalytic reactor 240. Then, the water travels downwards through the bed inside the reactor and is collected by the lateral pipes at the bottom of the reactor 240. The lateral pipes direct the water into a central raising pipe connected to the reactor outlet. Water exiting the reactor passes through valve 276 and is directed to filter 280 and treated water storage tank 290. Valves, 232, 235 and 275 are closed during normal mode of operation.

During a normal mode of operation, water for backwashing catalytic reactor is stored in tank 295. The valve 235 opens and the valve 276 closes so that all water exiting catalytic reactor 240 is directed to tank 295 until the tank is full. Tank full level is detected by the float level switch 297. Tank 295 has to be full before a backwash sequence is initiated. Float level switch 296 is used to protect the pump 246 from running dry in case the tank 295 is empty. When backwashing the catalytic oxidation bed, valves 231, 235, 275 and 276 are closed. Valve 232 is open. Water from tank 295 passes through the open pump isolation valve 245 and is pumped by pump 246. The pump 246 of preferably centrifugal type has its speed controlled through a variable frequency drive so that the programmed backwash flow rate is maintained. Backwash water flow rate is monitored by flow meter 305 and pump 246 speed is changed to maintain target flow. The pressure transmitter 215 is not absolutely necessary but is very useful to check faults and abnormal conditions such as leaks and blockages. Water passing through the flow meter 305 follows the pipe path to the check valve 236 and into the central pipe inside the reactor. Then, water exits through the lateral pipes at the bottom of the reactor. Further the water travels upwards expanding or fluidising the reactor bed. In order to fluidise the reactor bed, the backwash flow rate is usually higher than the flow rate for normal operation. Solids retained in the catalytic oxidation bed are entrained with the backwash water and exit reactor 240 through the upper outlet 244. Backwash water with solids passes through valve 232 and is directed to waste as spent backwash water. When the backwash sequence is completed, pump 246 stops and valves 232 and 231 change position for a rinse sequence. Valve 232 closes and valve 231 opens to allow water to enter the reactor as in normal mode. Valve 276 remains closed and valve 275 opens to direct the water to the buffer tank 10 at the front of treatment plant 700.

When the rinse sequence is completed, valve 235 opens and valve 275 closes to enable filling of tank 295. When float level switch 297 indicates full tank level, plant 700 changes operation to normal mode.

Figure 3:
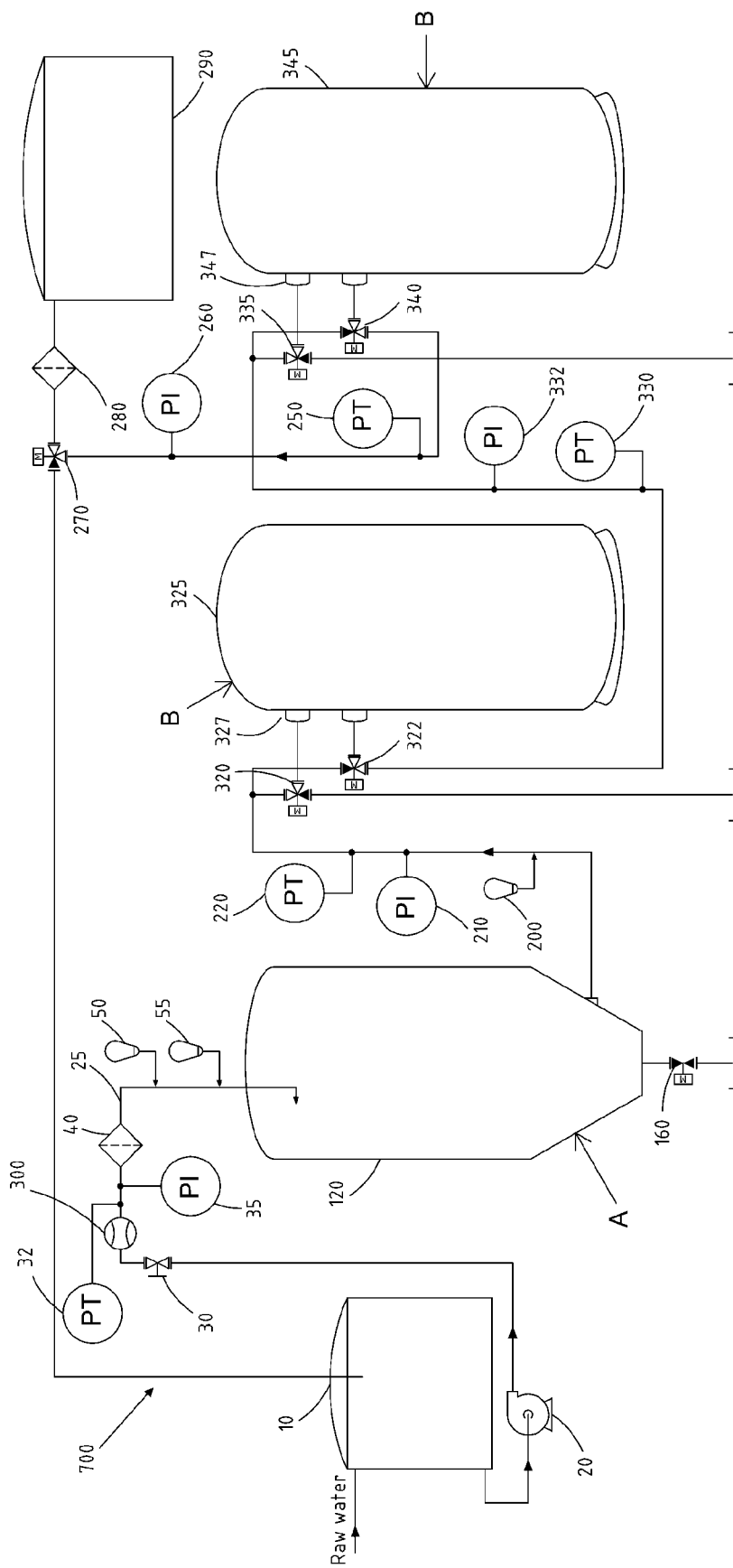
FIG. 3 is a process diagram of water treatment apparatus constructed and operated in accordance with another embodiment of the present invention for the case of higher amount of suspended solids and dissolved contaminants. Turbidity could be greater than 50 NTU and total amount of suspended solids could be more than 100 milligrams per litre.

Referring to FIG. 3, the process and plant uses two catalytic reactors 325 and 345, rather than one, to handle high levels of contamination and large amount of suspended solids and precipitates. Process steps essentially remain as above described for plant 700 of FIG. 1. The first catalytic reactor 325 is provided with a catalytic bed comprising the same granular catalytic material as described above though of coarser particle size than second catalytic reactor 345 to allow retention of a higher volume of suspended solids and precipitates. Water residence time in each catalytic reactor 325 and 345 is about two to three minutes. Catalytic oxidation, as above described, is the predominant oxidation mechanism in catalytic reactor 325. Catalytic advanced oxidation, as above described, is the predominant oxidation mechanism in catalytic reactor 345.

In a normal mode of operation, water enters valve 320 and is directed to the upper side of the catalytic reactor 325. Water travels downwards through the catalytic oxidation bed and is collected through the lateral pipes at the bottom of the catalytic oxidation reactor. The lateral pipes direct the water into the central raising pipe in the centre of the reactor and out of the reactor to valve 322. Valve 322 directs the water towards the second catalytic oxidation reactor to valve 335 and into the upper side of catalytic reactor 345. Then water travels downwards though the catalytic oxidation bed which again functions as described above in reference to FIG. 1. At the bottom of the catalytic bed, lateral pipes collect the water and direct it into the raising pipe in the centre of the catalytic oxidation reactor 345. The central pipe is connected to the outlet of the catalytic oxidation reactor 345. Water exiting catalytic oxidation reactor 345 passes through valve 340 towards valve 270. Valve 270 directs the water to filter 280, then to treated water storage tank 290.

Pressure transmitter 220, in conjunction with pressure transmitter 330, measure the differential pressure over the catalytic oxidation reactor 325 so that a backwash sequence is initiated when the differential pressure reaches a programmed value. In the same manner, the pressure transmitter 330, in conjunction with pressure transmitter 250, measure the differential pressure over the catalytic oxidation reactor 345. When a programmed value of the differential pressure is reached a backwash sequence is initiated. Backwash mode is initiated when any of the catalytic oxidation reactors 325 or 345 reach the condition of maximum differential pressure at which backwashing has to be carried out.

Backwashing is first carried out for the catalytic oxidation reactor 325. Water passes through the valve 322 and enters the catalytic oxidation reactor passing through the central pipe to the lateral pipes at the bottom of the catalytic oxidation reactor. Water exiting the lateral pipes moves upwards expanding the bed of the catalytic oxidation reactor and entraining retained solids. Water exits the catalytic oxidation rector 325 through the outlet 327 and passes through valve 320 to waste as spent backwash water. When the backwash sequence is completed, the position of the valves 320 and 322 changes to normal operating mode. There is no specific rinse mode for the catalytic oxidation reactor 325.

Alternatively, if only the amount of suspended solids is very high and other contaminants require treatment to be carried out only by one catalytic oxidation reactor, the first catalytic oxidation reactor 325 could be substituted with a common mixed media filter. Other treatment process functions, for example water softening, may be performed by the substitute filter.

Reactor 345 is put into backwash mode by changing position of valves 335 and 340. The hydraulic characteristics of the bed in the catalytic reactor 325 allow the usually higher flow rate needed for backwashing reactor 345, without excessive pressure drop. Catalytic oxidation reactor 325, which also performs filtration, is always backwashed first so that the pressure drop during backwashing catalytic oxidation reactor 345 is kept low. In a normal mode of operation, water from catalytic reactor 345 passes through valve 340 into the central pipe and down to the lateral pipes at the bottom of the reactor. Water exiting the lateral pipes moves upwards expanding the catalytic oxidation bed and entraining solids retained in the catalytic oxidation bed. Then, the water exits through the upper outlet 347 of catalytic oxidation reactor 345, passes through valve 335 and is directed further to waste as spent backwash water.

When the backwash sequence of catalytic oxidation reactor 345 is completed, rinse mode is initiated. During rinse mode, water exiting catalytic oxidation reactor 345 passes through valve 340 and towards valve 270. Valve 270 directs the water to the front of the plant 700 into buffer tank 10. When rinse mode is completed, valve 270 changes position to normal mode directing the water to filter 280 and treated water tank 290.

EXAMPLE 2

Treatment of Brisbane River Water

Water for testing was collected during Summer and the amount of algae and oxygen demand for treating the water was relatively high. Treatment was conducted with the object of producing drinking water using the process flow diagram of FIG. 3, as described above, with dosing of 2.5 mg/L potassium permanganate and 0.8 mg/L chlorine dioxide. Heavy metals and coliforms were present in the water. Results were as follows:

| Contaminant | Units | Raw Water | Treated Water | ADWG |
|---|---|---|---|---|
| Aluminium | mg/L | 0.67 | <0.01 | 0.2 |
| Cadmium | mg/L | 0.0001 | <0.0001 | 0.002 |
| Copper | mg/L | 0.026 | <0.001 | 2 |
| Lead | mg/L | 0.001 | <0.001 | 0.010 |
| Iron | mg/L | 0.74 | <0.05 | 0.3 |
| Coliforms | CU/100 mL | 10-20 | 0 | 0 |

ADWG: Australian Drinking Water Guidelines

Water quality had no coliforms or thermotolerant coliforms and water taste was very good. Water met the drinking water guidelines.

EXAMPLE 3

Treatment of Lake Water From China

Water for testing was collected during Summer and the amount of algae and oxygen demand for treating the water was relatively high. Treatment was conducted with the object of producing drinking water using the process flow diagram of FIG. 3 with dosing of 2.5 mg/L potassium permanganate and 0.8 mg/L chlorine dioxide. The raw water, containing thermotolerant coliforms (33 CFU/100 mL) and with unacceptable suspended solids (45 mg/L) colour (30 HTU) and turbidity (20.6 HTU) was oxygenated prior to treatment. Results were as follows:

| Contaminant | Units | Raw Water | Treated Water | ADWG |
|---|---|---|---|---|
| Suspended solids | mg/L | 45 | <0.01 | 0.2 |
| Colour | HU | 30 | 3 | 15 |
| Turbidity | NTU | 20.6 | 0.81 | 10 |
| Trihalomethanes | mg/L | — | 0.001 | 0.25 |
| Coliforms | CFU/100 mL | 33 | <2 | 0 |

ADWG: Australian Drinking Water Guidelines

Figure 4:
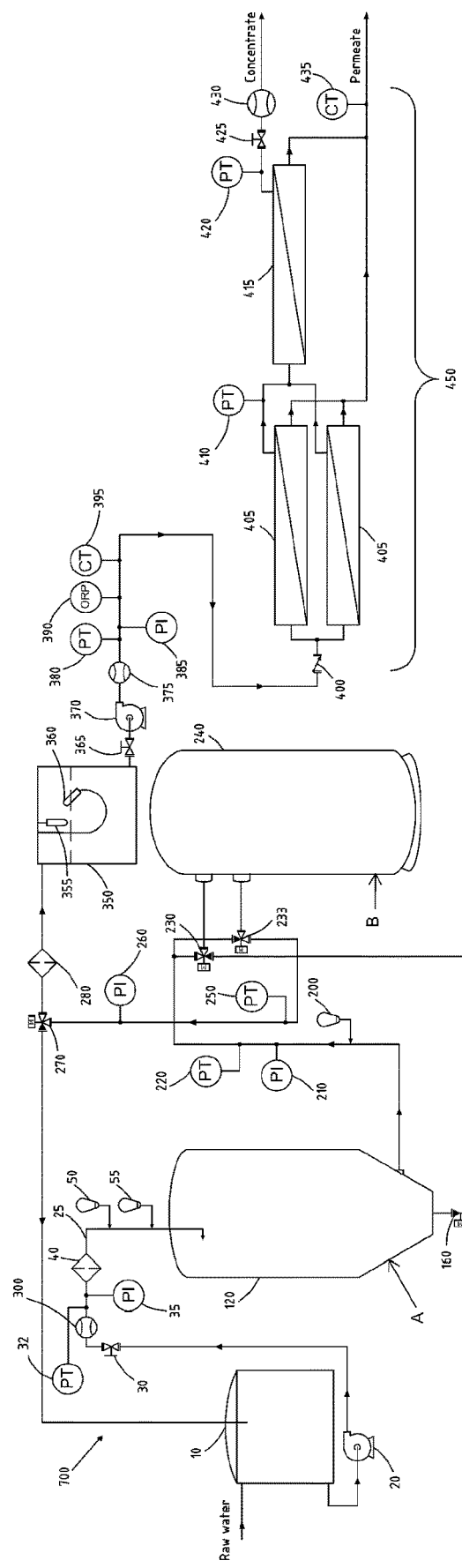
FIG. 4 is a process diagram of water treatment apparatus constructed and operated in accordance with another embodiment of the present invention integrating the embodiment described in FIG. 1 with reverse osmoses post treatment.

Referring to FIG. 4, the water treatment process and plant 700 shown is the same as that shown in FIG. 1, up to the point of delivering the water into the treated water storage tank 290. Instead of delivery to treated water storage tank 290, water is delivered into a buffer tank 350 for further feeding it to the reverse osmosis treatment section 450 where a final desalination step to meet drinking water standards is carried out in manner known to those skilled in the art.

When tank 350 is full, pump 20 stops and water production in the catalytic oxidation section of the plant stops, waiting for the reverse osmosis section 450 to process at least part of the water in the tank 360. The treatment capacity of the catalytic oxidation stage of plant 700 should be slightly higher than that of the reverse osmosis section to allow steady running during backwash and rinse sequences of the catalytic oxidation reactor, using water stored in buffer tank 350. Chlorine concentration in this water should be less than 0.05 mg/L to minimise damage to the thin film membranes used in the reverse osmosis section 450.

If the sensed oxidation potential of water in tank 350 is too high, indicating risk of damage to membranes, the water may be degassed before feeding it to the reverse osmosis membrane units 405 and 415. Degassing could be carried out using special membranes with depressurised external space. Vacuum pumps are used to reduce the pressure outside the degassing membranes. The membrane pore size allows gases to pass through but not the water molecules. As membranes with good resistance to oxidation are already available, the degassing unit processing is not typically needed and is so not shown in FIG. 4.

Reverse osmosis section 450 comprises two reverse osmosis separation stages. It could include more if required. Treatment for removal of chlorine and conditioning of water, such as acidification to reduce the risk of metal fouling or scaling, is unnecessary since water treated in catalytic oxidation reactor 240 (operating as described above) is already suitably conditioned. Furthermore, the feed water is free from contaminants which would make the concentrate toxic and difficult to dispose or be an environmental risk as is a common serious problem with conventional reverse osmosis water treatment plants.

Water from tank 350 passes through manual isolation valve 365 and is pumped by pump 370 controlled though a variable frequency drive. Flow is monitored through flow transmitter 375. Pressure transmitter 380 monitors the pressure in front of the first membrane stage. The process control driving quantity is this pressure which has to be maintained at a programmed value. Speed of pump 370 is varied to maintain pressure.

Oxidation reduction potential transmitter 390 is used to verify that oxidation potential of the feed water is not excessive, i.e not posing a risk of damage to the reverse osmosis membranes. Conductivity transmitter 395 indirectly measures dissolved solids or salts and, in conjunction with conductivity transmitter 435, measures the efficiency of salts removal of the membranes. An increase in conductivity measured by transmitter 435 could mean that the membranes are developing larger than normal porosity. Water enters the first stage of reverse osmosis membrane separation, with two membrane units 405, through check valve 400 which prevents backflow and potential membrane damage if pump 370 stops. Water flows through membrane units 405 and exits as first stage concentrate having pressure monitored at the first stage exit and second stage feed point by pressure transmitter 410. Part of the water passes through membranes as permeate and is mixed together with the permeate water of the second stage 415. Conductivity transmitter 435 monitors the conductivity of the mixed permeate.

Membrane unit 415 is the second reverse osmosis stage. Valve 425 is an adjustable valve to create backpressure at the exit of the concentrate and decrease the pressure gradient along the membranes. The product water could be further conditioned to suit particular use. This could be addition of minerals and chlorination for using it as drinking water, further demineralization through ion exchange so that the water is used as ultrapure water for industrial purposes etc. For large enough water production capacity it is economical to add to the plant a membranes cleaning assembly, not shown in FIG. 4.

Referring to FIG. 5, the process flow diagram is essentially the same in the catalytic oxidation section as the process and plant described in FIG. 1. The water inlet side, first part of flow control and some degree of water conditioning is customized to suit treatment of bulk supplied water. One kind of bulk supplied water is partially treated water distributed through pipe network similar to that of drinking water networks. Such a solution may be used for economically supplying water for industrial use where the quality of the process water needed is lower than that of drinking water. For example, water utilities in Australia supply bulk water to many mining companies. Only a small part of the bulk supplied water needs to be treated to drinking water quality guidelines or higher quality standards and the treatment is carried out close to the point of use.

Another kind of bulk supplied water is water supplied on drinking water networks not meeting entirely the standard for consumption. The usual minimal treatment requirement for such water is boiling for disinfection before use for drinking and cooking purposes.

In many cases, water is suitably treated to drinking water standards at the water treatment plant but the contamination happens in the distribution network. Distribution networks for drinking water may not maintain the required water quality standards being contaminated with pathogens, organic material from bacterial slime deposits in pipes and heavy metals from pipes and fittings. All networks have some leaking pipes. When pressure is lost during interruption of supply, some of the leaking water leaks back into supply pipes. Often there is in the proximity leakage from sewerage pipes. Hence, the pathogen contamination of water leaking back into drinking water pipe could be extremely high. Bulk supplied water typically has sufficient water pressure to avoid the use of a pump to assist treatment in the water treatment plant at the specific point of use. If, the water pressure is insufficient for processing, a booster pump has to be used.

There are also situations when the raw water pressure is excessively high and pressure has to be decreased. In FIG. 5, manual valve 450 enables water supply shut down when plant 700 needs maintenance including cleaning sediment filter 40. Plant 700 requires much lower pressure than most other water treatment systems. A pressure reducing valve 455 is used in FIG. 5 to protect downstream equipment and to reduce the pressure fluctuations and pressure shocks. Reducing pressure fluctuations improves downstream flow control. When the water pressure is lower than the set pressure at valve 455, the valve will be fully open. Pressure reducing valve 455 is not always needed. For example, if bulk supply line pressure does not exceed the maximum safe limit for the equipment in the plant or the pressure is lower than the supply pressure needed to operate the plant, then there is no need for a pressure reducing valve. Solenoid valve 457 opens for running the plant 700 and closes for stopping plant operation. If bulk supply line pressure is not high enough for operating the plant a booster pump 460 is used to increase the pressure. Pump 460 could be operated at constant speed or driven through a variable frequency drive for saving energy. Check valve 465 allows the water to bypass pump 460 when there is enough pressure and prevents back flow of water when pump 460 is operated to increase pressure. If the bulk supply line provides sufficient pressure to operate the plant 700, booster pump 460 and check valve 465 are not needed. Pressure transmitter 470 monitors the pressure in front of the flow control valve 475. When booster pump 460 is operated through a variable frequency drive, pump speed is adjusted so that pressure is maintained constant in front of flow control valve 475 making the flow control strategy simpler and more reliable. Pressure indicator 35 provides a convenient visual indication of pressure before the flow control valve. Flow control valve 475 could be a ball valve with proportional position control or other type of valve controlling the flow though changing the passage area of water through the valve. Change of flow is needed in particular because the flow for normal mode of operation and flow for backwash mode are not the same. Also, as the fixed bed in the catalytic oxidation reactor 240 accumulates solids, pressure drop increases and the flow rate through the plant tends to decrease. Valve 475 is controlled to open more to maintain the flow at programmed value.

Dosing unit 50 is used for dosing the inorganic oxidising agent, advantageously potassium permanganate, for pre oxidation of water. This dosing unit has to be connected as far as possible upstream to give enough time for the pre oxidation reactions to complete. The pressure downstream from the flow control valve 475 is lower than pressure in front of this valve and this is a suitable point to connect the dosing unit for pre oxidation. Flow transmitter 300 monitors the flow and the control system of the plant opens or closes more or less valve 475 to maintain target flow. Pressure of the regulated flow could be visually checked at pressure indicator 35. This pressure indicator is very useful for fault finding in case of malfunction of other components. Dosing unit 55 is for pH correction, used to dose a base or acid if necessary to correct the pH of the water. Because the pressure of the water exiting the plant during rinse mode is low and buffer tank 10 at the front side of the plant 700 is omitted, the rinse spent water is discharged to drain as is backwash spent water. When available and for limited amount of water to be discharged, the backwash spent water and rinse spent water are discharged into municipal sewerage drain. When water is treated for drinking and cooking and has to be distributed to multiple households a booster pumping station and chlorination dosing unit (which could use chlorine at this point post-treatment) are added to condition and distribute water stored in the treated water tank 290.

EXAMPLE 4

Treatment of Municipal Piped Water
(MPW)—China

MPW was sourced from two Chinese cities C1 and C2 and treated in accordance with the process flow diagram of FIG. 5 as described above. C1 raw water had a content of 0.056 mg/L trihalomethanes, reduced to 0.028 mg/L, compared with ADWG of 0.25 mg/L, with generally improved water quality when treated by the above described process.

C2 raw water had excessive dissolved organic material with turbidity 3.7 NTU, chemical oxygen demand (COD) of 17.5 mg/L and nitrite 4.14 mg/L exceeding acceptable health standards due to the dissolved organic material causing reducing conditions and reduction of nitrate to nitrite. At the concentration in the sample, infants could be affected by Blue baby Syndrome to some degree. Water treated by the above described process had COD<5 mg/L and turbidity 0.1 NTU as well as an acceptable nitrite level, nitrite being oxidised in the process.

EXAMPLE 5

Treatment of Municipal Piped Water
(MPW)—Australia

In Australia, MPW quality is generally good. However, in one city, tap water can have a muddy water taste during warmer periods of the year, similar to the taste of river or lake water. Residual chlorine was also too low at 0.01 mg/L rather than the 0.05 mg/L or above which would provide assurance against pathogen contamination. Water treated by the above described process, indeed using only one catalytic oxidation reactor, had improved taste. 0.3 mg/L potassium permanganate was dosed into the water for pre-oxidation (oxidation step (a)) with a retention time of 10 minutes in the pre-oxidation vessel and 0.2 mg/L chlorine dioxide was used for disinfection and step (b). After treatment the water taste was very good, with no muddy taste detected.

The above described processes demonstrated effective utilisation of permanganate, especially potassium permanganate, as an oxidant from both cost and contaminant removal efficiency perspectives. A particular feature of the processes is that treated water did not have a pink colour associated with dilute potassium permanganate streams. The catalytic oxidation reactor(s) forced decomposition of residual permanganate (from pre-oxidation) to low enough concentration that visibly observable pink colour was avoided. This was found to be so even if water first entering the catalytic oxidation stage had been intense pink to violet colour due to presence of residual potassium permanganate following pre-oxidation (oxidation step (a)).

There are many possible modifications and variations for raw water storage, plant intake and handling of water as with variations for backwashing solution and spent water recovery. Such modifications may be apparent to the skilled reader of this disclosure and are deemed within the scope of the present disclosure.

There are alternatives to inclusion of a buffer tank 10. An intermediate pond would typically provide greater buffer capacity and opportunity for stabilizing the condition of the water reducing variation of water characteristics and improving its quality. Such an intermediate buffer pond could store water pumped from a river or from an underground aquifer noting that, during rainy periods, river water turbidity could be very high. During such conditions, water would not be pumped into the buffer pond with only water in storage being treated. For water from an underground aquifer, such a buffer pond would provide stabilization of water under atmospheric conditions: degassing of carbon dioxide, hydrogen sulphide, radon and other possible dissolved gases, oxidation and precipitation of part of any iron and other heavy metals present and increase in dissolved oxygen. When a buffer pond is not used, the raw water intake from the river provides screening and initial coarse filtration. Preferably, the intake is designed similar to water wells for using water from an underground aquifer. The well screen and part of the casing are sunk into the river bed or the well is made on the river bank. The water entering the well is filtered through river bed or river bank ground to usually achieve turbidity substantially lower than 10 NTU.

The invention claimed is:

1. A process for treating water containing contaminants comprising the sequential steps of:
 (a) in a first vessel a first oxidation step comprising contacting water to be treated with an inorganic oxidising salt containing manganese or iron for a time effective for oxidising a portion of said contaminants;
 (b) contacting water treated in oxidation step (a) with at least a chlorine containing agent for disinfection and to generate, in situ and through reaction with chemical compounds produced in oxidation step (a), a coagulant for coagulating oxidised contaminants present in the water;
 (c) separating coagulated contaminants from the water; and
 (d) in a second vessel subjecting water from step (c) to a further oxidation step for oxidising residual oxidisable contaminants, said oxidation being catalytic oxidation catalysed, in combination, by:
   (i) manganese or iron depending on the selected inorganic oxidising salt left in solution after oxidation step (a); and
   (ii) a solid phase catalyst comprising a granular catalytic material for oxidising residual oxidisable contaminants,
 wherein the amount of inorganic oxidising salt added is such that, following separating step (c), sufficient manganese or iron remains in solution to act as a catalyst in step (d); and
 wherein step (d) is carried out using a bed reactor, column reactor and/or a filter bed.

2. The process as claimed in claim 1, wherein the inorganic oxidising salt is a metal permanganate, selected from the group consisting of potassium permanganate, sodium permanganate, barium permanganate, calcium permanganate, and aluminium permanganate.

3. The process as claimed in claim 2, further comprising sulphate removal and wherein said metal permanganate is selected from barium permanganate and calcium permanganate.

4. The process of claim 2, wherein the inorganic oxidizing salt contacted with the water in step (a) is potassium permanganate and the chlorine containing agent contacted with the water in step (b) is chlorine dioxide.

5. The process of claim 2, wherein treated water from catalytic oxidation step (d) has no visible colouration due to the presence of residual permanganate.

6. The process of claim 5, wherein said inorganic oxidising salt is potassium permanganate and water introduced to catalytic oxidation step (d) has visible colouration due to presence of potassium permanganate.

7. The process as claimed in claim 1, conducted at ambient temperature and ambient or about ambient pressure.

8. The process of claim 1, wherein said in situ coagulant formed in solution in oxidation step (a) is selected from the group consisting of oxides or hydroxides of manganese, iron and aluminum, and combinations thereof.

9. The process of claim 8, wherein said in situ coagulant is MnOOH.

10. The process of claim 1, wherein said chlorine containing agent for step (b) includes, in descending order of preference, chlorine dioxide and a metal hypochlorite and excludes chlorine gas to minimise formation of disinfection by-products.

11. The process of claim 1, further comprising a step (e) of membrane separation to remove dissolved salts, and wherein the chlorine containing agent contacted with the water in step (b) is chlorine dioxide.

12. The process of claim 11 wherein chlorine is added to water for disinfection of treated water for storage and distribution after step (d) or step (e).

13. The process of claim 11, wherein potassium permanganate is used in step (a) and chlorine dioxide is used in step (b).

14. The process of claim 1, further comprising a step (e) of membrane separation to remove dissolved salts, and oxidation potential is measured ahead of membrane separation and adjusted to remove any one of dissolved oxygen and chlorine.

15. The process of claim 14, wherein chlorine added to treated water and is used for disinfection of treated water for storage and distribution after step (d) or step (e).

16. The process of claim 14, wherein oxidation potential is adjusted by degassing.

17. The process of claim 1, wherein water is treated with oxygen, or at least an oxygen enriched gas before oxidation step (a).

18. The process of claim 1, wherein biological oxidation demand (BOD) or chemical oxidation demand (COD) of water to be treated is reduced prior to step (a).

19. The process of claim 18, wherein water to be treated has COD greater than about 1000 mg/L.

20. The process of claim 1, wherein said granular catalytic materials are granules consisting of silica or alumina supported metal oxides or mixtures of metal oxides selected from the group consisting of manganese oxide, manganese dioxide, iron oxides, aluminium oxides, titanium dioxide, perovskite, rare earth oxides, zeolites and electrically conductive catalytic materials.

21. The process of claim 1, wherein the water to be treated is water obtained from a lake, pond, dam, river, underground aquifer, or is municipal or industrial wastewater.

22. A process for treating water containing contaminants comprising the sequential steps of:
 (a) in a first vessel a first oxidation step comprising contacting water to be treated with an inorganic oxidising salt containing manganese for a time effective for oxidising a portion of said contaminants;
 (b) contacting water treated in oxidation step (a) with at least a chlorine containing agent for disinfection and to generate, in situ and through reaction with chemical compounds produced in oxidation step (a), a coagulant for coagulating oxidised contaminants present in the water;
 (c) separating coagulated contaminants from the water; and
 (d) in a second vessel subjecting water from step (c) to a further oxidation step for oxidising residual oxidisable contaminants, said oxidation being catalytic oxidation catalysed, in combination, by:
- (i) manganese left in solution after oxidation step (a); and
- (ii) a solid phase catalyst comprising a granular catalytic material for oxidizing residual oxidizable contaminants, further comprising sulphate removal and wherein said inorganic oxidising salt in step (a) is selected from barium permanganate, and calcium permanganate wherein the amount of inorganic oxidising salt added in step (a) is such that, following separating step (c), sufficient manganese remains in solution to act as a catalyst in step (d); and wherein step (d) is carried out using a bed reactor, column reactor and/or a filter bed.

23. The process of claim 22, wherein the water to be treated is water obtained from a lake, pond, dam, river, underground aquifer, or is municipal or industrial wastewater.

24. A process for treating water containing contaminants comprising the sequential steps of:
- (a) in a first vessel a first oxidation step comprising contacting water to be treated with an inorganic oxidising salt containing manganese or iron for a time effective for oxidising a portion of said contaminants;
- (b) contacting water treated in oxidation step (a) with at least a chlorine containing agent for disinfection and to generate, in situ and through reaction with chemical compounds produced in oxidation step (a), a coagulant for coagulating oxidised contaminants present in the water;
- (c) separating coagulated contaminants from the water; and
- (d) in a second vessel subjecting water from step (c) to a further oxidation step for oxidising residual oxidisable contaminants, said oxidation being catalytic oxidation catalysed, in combination, by:
  - (i) manganese or iron depending on the selected inorganic oxidising salt left in solution after oxidation step (a); and
  - (ii) a solid phase catalyst comprising a granular catalytic material for oxidizing residual oxidizable contaminants, and said process is conducted at ambient temperature and ambient or about ambient pressure, wherein the amount of inorganic oxidising salt added in step (a) is such that, following separating step (c), sufficient manganese or iron remains in solution to act as a catalyst in step (d); and wherein step (d) is carried out using a bed reactor, column reactor and/or a filter bed.

25. The process of claim 24, wherein the water to be treated is water obtained from a lake, pond, dam, river, underground aquifer, or is municipal or industrial wastewater.

* * * * *